United States Patent
Maeda et al.

(10) Patent No.: US 10,550,234 B2
(45) Date of Patent: *Feb. 4, 2020

(54) ACRYLIC RESIN FILM

(71) Applicant: KURARAY Co., Ltd., Kurashiki-shi (JP)

(72) Inventors: Kaori Maeda, Tainai (JP); Takuya Tsujimoto, Tainai (JP); Toru Takahashi, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 264 days.

This patent is subject to a terminal disclaimer.

(21) Appl. No.: 15/039,070

(22) PCT Filed: Nov. 25, 2014

(86) PCT No.: PCT/JP2014/081001
§ 371 (c)(1),
(2) Date: May 25, 2016

(87) PCT Pub. No.: WO2015/076398
PCT Pub. Date: May 28, 2015

(65) Prior Publication Data
US 2017/0158830 A1    Jun. 8, 2017

(30) Foreign Application Priority Data

Nov. 25, 2013  (JP) .................. 2013-242695

(51) Int. Cl.
| C08J 5/18 | (2006.01) |
| B32B 15/08 | (2006.01) |
| B32B 27/30 | (2006.01) |
| C08L 33/10 | (2006.01) |
| C08L 53/00 | (2006.01) |
| B32B 15/082 | (2006.01) |
| C08L 33/08 | (2006.01) |
| B32B 27/08 | (2006.01) |

(52) U.S. Cl.
CPC .................. *C08J 5/18* (2013.01); *B32B 15/08* (2013.01); *B32B 15/082* (2013.01); *B32B 27/08* (2013.01); *B32B 27/308* (2013.01); *C08L 33/08* (2013.01); *C08L 33/10* (2013.01); *C08L 53/00* (2013.01); *B32B 2307/412* (2013.01); *B32B 2307/418* (2013.01); *B32B 2307/536* (2013.01); *B32B 2307/538* (2013.01); *B32B 2551/00* (2013.01); *C08J 2333/12* (2013.01); *C08J 2453/00* (2013.01)

(58) Field of Classification Search
CPC ............... B32B 15/082; B32B 27/308; B32B 2307/412; C08J 2333/12; C08J 2453/00; C08L 33/08; C08L 33/10
See application file for complete search history.

(56) References Cited

U.S. PATENT DOCUMENTS

| 2003/0191243 A1* | 10/2003 | Hamada | .............. C08F 297/026 525/94 |
| 2007/0154689 A1* | 7/2007 | Hughes | .................. B32B 21/02 428/195.1 |
| 2011/0183135 A1 | 7/2011 | Gerard | |
| 2011/0218303 A1* | 9/2011 | Oshima | ....................... C08J 5/18 525/94 |
| 2013/0209814 A1* | 8/2013 | Bharti | ....................... B32B 7/12 428/463 |
| 2013/0217827 A1* | 8/2013 | Ozawa | .................... C08L 33/08 525/94 |

(Continued)

FOREIGN PATENT DOCUMENTS

EP    2 918 636 A1    9/2015
JP    2000-154329 A    6/2000

(Continued)

OTHER PUBLICATIONS

Supplementary European Search Report dated Jun. 6, 2017 in Patent Application No. 14864027.
International Search Report dated Mar. 3, 2015 in PCT/JP2014/081001, filed Nov. 25, 2014.

*Primary Examiner* — Scott R. Walshon
*Assistant Examiner* — Jasper Saberi
(74) *Attorney, Agent, or Firm* — Oblon, McClelland, Maier & Neustadt, L.L.P.

(57) ABSTRACT

An acrylic resin film comprising 50 to 99 parts by mass of a methacrylic resin (A) comprising not less than 80% by mass of a structural unit derived from methyl methacrylate, and 50 to 1 part by mass of a block copolymer (B) comprising 40 to 90% by mass of methacrylic acid ester polymer block[s] (b1) and 10 to 60% by mass of acrylic acid ester polymer block[s] (b2), provided that the total of the methacrylic resin (A) and the block copolymer (B) is 100 parts by mass, wherein the methacrylic resin (A) and the block copolymer (B) satisfy the inequations (1) and (2):

$$0.5 \leq Mw_{(A)}/Mw_{(b1)} \leq 2.3 \qquad (1)$$

$$30000 \leq Mw_{(b2)} \leq 120000 \qquad (2)$$

in which $Mw_{(A)}$ is the weight average molecular weight of the methacrylic resin (A), $Mw_{(b1)}$ is the largest weight average molecular weight among the methacrylic acid ester polymer block[s] (b1) and $Mw_{(b2)}$ is the largest weight average molecular weight among the acrylic acid ester polymer block[s] (b2).

20 Claims, No Drawings

(56) References Cited

U.S. PATENT DOCUMENTS

2015/0299449 A1   10/2015   Ozawa et al.

FOREIGN PATENT DOCUMENTS

| JP | 2003-277574 | A | | 10/2003 | |
|----|----|----|----|----|----|
| JP | 2012-503697 | A | | 2/2012 | |
| WO | 2010/055798 | A1 | | 5/2010 | |
| WO | 2012/057079 | A1 | | 5/2012 | |
| WO | WO-2012057079 | A1 | * | 5/2012 | .............. C08L 33/08 |
| WO | 2014/073216 | A1 | | 5/2014 | |

* cited by examiner

ACRYLIC RESIN FILM

TECHNICAL FIELD

The present invention relates to an acrylic resin film. More specifically, the present invention relates to an acrylic resin film excellent in transparency, surface hardness, surface smoothness and the like, in which whitening is less significant when stretched, bended, impacted, or heated.

BACKGROUND ART

Transparent resin films are used for automobile interiors, appliance exteriors, wallpapers and the like for purposes of decorating them with patterns such as a wood grain tone or the like; conferring designability such as a metallic tone or the like; and protecting (conferring scratch resistance and weather resistance on) base materials (for automobile interior, appliance exteriors, wallpapers and the like). Among these, acrylic resin films excellent in transparency, weather resistance, and surface hardness are widely used for decorating films having a function for protecting base materials.

However, a film consisting only of a methacrylic resin is very brittle, and difficult to be formed into a film, and further has very poor handling properties. Therefore, problems such as breakage may occur when trimming upon film-forming, when cutting the film after film-forming, when bonding the film to a base material, or when removing unwanted portions (burrs) after bonding the film to a base material.

Accordingly, in order to reduce the brittleness of the aforementioned film consisting only of a methacrylic resin, acrylic resin films in which so-called core-shell particles are blended have been suggested.

For example, Patent Document 1 suggests an acrylic resin film in which core-shell particles (commonly called two-layered core-shell particles) are blended into a methacrylic resin, the core-shell particles being obtained by co-polymerizing methacrylic acid alkyl ester and acrylic acid alkyl ester in the presence of cross-linked particles of acrylic acid alkyl ester polymer.

The acrylic resin film in which the above two-layered core-shell particles are blended usually has low surface hardness. Accordingly, in order to improve it, so-called three-layered core-shell particles (Patent Document 2) and an acrylic resin film in which the three-layered core-shell particles are blended have been suggested (Patent Documents 3 or 4). If the surface hardness of the acrylic resin film were high, the scratch resistance of the film would be improved, having an advantage as a protective film.

Meanwhile, core-shell particles themselves have no fluidity because they are cross-linked. Therefore, when core-shell particles are blended into a methacrylic resin, a portion of the core-shell particles inevitably protrude from a surface of a film formed by a film-forming process (for example, melt forming with a T die or inflation forming). This reduces the surface smoothness of the acrylic resin film.

In particular, three-layered core-shell particles generally do not easily undergo deformation as compared with two-layered core-shell particles. Therefore, an acrylic resin film comprising three-layered core-shell particles has a higher surface hardness, but a significantly lower surface smoothness as compared with an acrylic resin film comprising two-layered core-shell particles.

A decreased surface smoothness of a film tends to increase the brittleness of the film when cutting the film after film-forming, when bonding the film to abase material, or when removing unwanted portions (burrs) after bonding the film to a base material.

Further, when forming a layer comprising metal and/or metal oxide on a surface of a formed article, in particular a film of an acrylic resin, the surface smoothness of the formed article has very significant impacts. That is, the surface smoothness of a formed article directly affects the surface smoothness of a layer comprising metal and/or metal oxide formed on the surface of the formed article, which in turn affects the handling properties and designability such as mirror gloss of a laminated product.

Further, in a case where the surface of another resin is decorated with a formed article of an acrylic resin on which a layer comprising metal and/or metal oxide is formed by the simultaneous injection molding and in-mold laminating method, surface gloss is also significantly decreased because the surface smoothness of the formed article of the acrylic resin is low.

Further, another problem is that whitening occurs upon bending and heating when a film containing core-shell particles is subjected to secondary processing, resulting in deteriorated appearance.

CITATION LIST

Patent Literatures

Patent Document 1: JP S56-27378 B
Patent Document 2: JP S55-27576 B
Patent Document 3: JP H10-279766 A (JP 3287255 B)
Patent Document 4: JP H11-147237 A (JP 3287315 B)

SUMMARY OF THE INVENTION

Problems to be Resolved by the Invention

An objective of the present invention is to provide an acrylic resin film being excellent in transparency, surface hardness, surface smoothness and the like, in which whitening is less significant when stretched, bended, impacted, or heated.

Means for Solving the Problems

After conducting extensive studies, the present inventors completed an invention including the following aspects.
[1] An acrylic resin film comprising
50 to 99 parts by mass of a methacrylic resin (A) comprising not less than 80% by mass of a structural unit derived from methyl methacrylate and
50 to 1 part by mass of a block copolymer (B) comprising 40 to 90% by mass of methacrylic acid ester polymer block[s] (b1) and 10 to 60% by mass of acrylic acid ester polymer block[s] (b2), wherein the total of the methacrylic resin (A) and the block copolymer (B) is 100 parts by mass, and the methacrylic resin (A) and the block copolymer (B) satisfy the inequations (1) and (2):

$$0.5 \leq Mw_{(A)}/Mw_{(b1)} \leq 2.3 \tag{1}$$

$$30000 \leq Mw_{(b2)} \leq 120000 \tag{2}$$

in which $Mw_{(A)}$ is the weight average molecular weight of the methacrylic resin (A), $Mw_{(b1)}$ is the largest weight average molecular weight among the methacrylic acid ester polymer block[s] (b1) and $Mw_{(b2)}$ is the largest weight average molecular weight among the acrylic acid ester polymer block[s] (b2).

[2] The acrylic resin film according to [1], wherein the block copolymer (B) has a refractive index of 1.485 to 1.495.

[3] The acrylic resin film according to [1] or [2], the acrylic acid ester polymer block[s] (b2) comprising 50 to 90% by mass of a structural unit derived from acrylic acid alkyl ester and 50 to 10% by mass of a structural unit derived from aromatic (meth)acrylic acid ester.

[4] The acrylic resin film according to any one of [1] to [3], the film having a surface roughness of not more than 1.5 nm.

[5] The acrylic resin film according to any one of [1] to [4], the film having a surface pencil hardness of not softer than HB.

[6] The acrylic resin film according to any one of [1] to [5], the film printed on at least one surface thereof.

[7] A laminate film comprising the acrylic resin film according to any one of [1] to [6], and
a layer comprising metal and/or metal oxide, a thermoplastic resin layer or a base material layer; the layer being placed on at least one surface of the acrylic resin film.

[8] A laminated product having a surface layer, wherein the surface layer comprises the acrylic resin film according to any one of [1] to [6] or the laminate film according to [7].

[9] A method for manufacturing an acrylic resin film, the method comprising
polymerizing a monomer constituting methacrylic acid ester polymer block[s] (b1) and polymerizing a monomer constituting acrylic acid ester polymer block[s] (b2) to prepare a block copolymer (B) comprising 40 to 90% by mass of the methacrylic acid ester polymer block[s] (b1) and 10 to 60% by mass of the acrylic acid ester polymer block[s] (b2),
melt-kneading 50 to 99 parts by mass of a methacrylic resin (A) comprising not less than 80% by mass of a structural unit derived from methyl methacrylate with 50 to 1 part by mass of the block copolymer (B), provided that the total of the methacrylic resin (A) and the block copolymer (B) is 100 parts by mass, to obtain a methacrylic resin composition, and
forming the methacrylic resin composition into a film shape, in which the methacrylic resin (A) and the block copolymer (B) satisfy the inequations (1) and (2):

$$0.5 \leq Mw_{(A)}/Mw_{(b1)} \leq 2.3 \quad (1)$$

$$30000 \leq Mw_{(b2)} \leq 120000 \quad (2)$$

wherein $Mw_{(A)}$ is the weight average molecular weight of the methacrylic resin (A), $Mw_{(b1)}$ is the largest weight average molecular weight among the methacrylic acid ester polymer block[s] (b1) and $Mw_{(b2)}$ is the largest weight average molecular weight among the acrylic acid ester polymer block[s] (b2).

Advantageous Effects of the Invention

The acrylic resin film according to the present invention is excellent in transparency, surface hardness, surface smoothness and the like and has less significant whitening when stretched, bended, heated. Taking advantage of these superior characteristics, the acrylic resin film according to the present invention can be suitably used for products requiring designability and for optical uses.

EMBODIMENTS FOR CARRYING OUT THE INVENTION

The acrylic resin film according to the present invention comprises a methacrylic resin (A) and a block copolymer (B). Note that a mixture of the methacrylic resin (A), the block copolymer (B) and an optional component may be referred to a methacrylic resin composition.

The methacrylic resin (A) used in the present invention is not less than 80% by mass, preferably not less than 90% by mass in the proportion of a structural unit derived from methyl methacrylate. Further, the proportion of a structural unit derived from a monomer other than methyl methacrylate in the methacrylic resin (A) is not more than 20% by mass, preferably not more than 10% by mass.

Examples of the monomer other than methyl methacrylate can include acrylic acid esters such as methyl acrylate, ethyl acrylate, n-propyl acrylate, isopropyl acrylate, n-butyl acrylate, isobutyl acrylate, s-butyl acrylate, t-butyl acrylate, amyl acrylate, isoamyl acrylate, n-hexyl acrylate, 2-ethylhexyl acrylate, pentadecyl acrylate, dodecyl acrylate; phenyl acrylate, benzyl acrylate, phenoxyethyl acrylate, 2-hydroxyethyl acrylate, 2-ethoxyethyl acrylate, glycidyl acrylate, allyl acrylate; cyclohexyl acrylate, norbornenyl acrylate, isobornyl acrylate or the like; methacrylic acid esters other than methyl methacrylate such as ethyl methacrylate, n-propyl methacrylate, isopropyl methacrylate, n-butyl methacrylate, isobutyl methacrylate, s-butyl methacrylate, t-butyl methacrylate, amyl methacrylate, isoamyl methacrylate, n-hexyl methacrylate, 2-ethylhexyl methacrylate, pentadecyl acrylate, dodecyl methacrylate; phenyl methacrylate, benzyl methacrylate, phenoxyethyl methacrylate, 2-hydroxyethyl methacrylate, 2-ethoxyethyl methacrylate, glycidyl methacrylate, allyl methacrylate; cyclohexyl methacrylate, norbornenyl methacrylate, isobornyl methacrylate or the like; unsaturated carboxylic acids such as acrylic acid, methacrylic acid, maleic anhydride, maleic acid, itaconic acid or the like; olefins such as ethylene, propylene, 1-butene, isobutylene, 1-octene or the like; conjugated dienes such as butadiene, isoprene, myrcene or the like; aromatic vinyl compounds such as styrene, α-methyl styrene, p-methyl styrene, m-methyl styrene or the like; acrylamide, methacrylamide, acrylonitrile, methacrylonitrile, vinyl acetate, vinylpyridine, vinyl ketone, vinyl chloride, vinylidene chloride, vinylidene fluoride; and the like.

There is no particular limitation for the stereoregularity of the methacrylic resin (A), and for example, those having isotactic, heterotactic, syndiotactic stereoregularities and the like may be used.

The weight average molecular weight $Mw_{(A)}$ of the methacrylic resin (A) is preferably not less than 30,000 and not more than 180,000, more preferably not less than 40,000 and not more than 150,000, and in particular preferably not less than 50,000 and not more than 130,000. In a case where $Mw_{(A)}$ is small, the impact resistance and toughness of a formed article obtained from the resulting methacrylic resin composition tend to be decreased. In a case where $Mw_{(A)}$ is large, the fluidity of the methacrylic resin composition tends to be decreased, resulting in decreased forming processability.

The methacrylic resin (A) has the ratio of the weight average molecular weight $Mw_{(A)}$ to the number average molecular weight $Mn_{(A)}$, $Mw_{(A)}/Mn_{(A)}$ (hereinafter, the ratio of the weight average molecular weight to the number average molecular weight (weight average molecular weight/number average molecular weight) may be referred to as the "molecular weight distribution") of preferably not less than 1.03 and not more than 2.6, more preferably not less than 1.05 and not more than 2.3, and in particular preferably not less than 1.2 and not more than 2.0. In a case where the molecular weight distribution is small, the forming processability of the methacrylic resin composition tends to be decreased. In a case where the molecular weight distribution is large, the impact resistance of a formed article obtained from the methacrylic resin composition tends to be decreased, resulting in increased brittleness.

Note that $Mw_{(A)}$ and $Mn_{(A)}$ are in terms of the polystyrene standard as measured by GPC (gel permeation chromatography).

Further, the molecular weight and the molecular weight distribution of a methacrylic resin can be controlled by adjusting types, amounts and the like of polymerization initiators and chain transfer agents.

A methacrylic resin may be obtained by polymerizing monomers (a monomer mixture) comprising not less than 80% by mass of methyl methacrylate.

In the present invention, a commercially available product may be used for the methacrylic resin (A). Examples of the aforementioned commercially available methacrylic resin can include, for Example, "PARAPET H1000B" (MFR: 22 g/10 minutes (230° C., 37.3N)), "PARAPET GF" (MFR: 15 g/10 minutes (230° C., 37.3N)), "PARAPET EH" (MFR: 1.3 g/10 minutes (230° C., 37.3N)), "PARAPET HRL" (MFR: 2.0 g/10 minutes (230° C., 37.3N)), "PARAPET HRS" (MFR: 2.4 g/10 minutes (230° C., 37.3N)) and "PARAPET G" (MFR: 8.0 g/10 minutes (230° C., 37.3N)) [all are product names, Kuraray Co., Ltd.] and the like.

The block copolymer (B) used in the present invention comprises methacrylic acid ester polymer blocks (b1) and acrylic acid ester polymer blocks (b2). The block copolymer (B) may comprise one methacrylic acid ester polymer block (b1) or may comprise two or more methacrylic acid ester polymer blocks (b1). Further, the block copolymer (B) may comprise one acrylic acid ester polymer block (b2), or may comprise two or more acrylic acid ester polymer blocks (b2).

The methacrylic acid ester polymer block (b1) has a structural unit derived from methacrylic acid ester as the main structural unit. The proportion of a structural unit derived from methacrylic acid ester in the methacrylic acid ester polymer block (b1) is preferably not less than 80% by mass, more preferably not less than 90% by mass, even more preferably not less than 95% by mass, and in particular preferably not less than 98% by mass.

Examples of the aforementioned methacrylic acid ester can include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, 2-methoxyethyl methacrylate, glycidyl methacrylate, allyl methacrylate and the like. Among these, in view of increased transparency and thermal resistance, methacrylic acid alkyl esters are preferred such as methyl methacrylate, ethyl methacrylate, isopropyl methacrylate, n-butyl methacrylate, tert-butyl methacrylate, cyclohexyl methacrylate, isobornyl methacrylate; and methyl methacrylate is more preferred. The methacrylic acid ester polymer block (b1) can be formed by polymerizing these methacrylic acid esters alone or in combination of two or more.

The methacrylic acid ester polymer block (b1) may comprise a structural unit derived from a monomer other than methacrylic acid ester as long as the objectives and effects of the present invention are not impaired. The proportion of a structural unit derived from a monomer other than methacrylic acid ester contained in the methacrylic acid ester polymer block (b1) is in the range of preferably not more than 20% by mass, more preferably not more than 10% by mass, even more preferably not more than 5% by mass, and in particular preferably not more than 2% by mass.

Examples of the monomer other than methacrylic acid ester can include acrylic acid esters, unsaturated carboxylic acids, aromatic vinyl compounds, olefins, conjugated dienes, acrylonitrile, methacrylonitrile, acrylamide, methacrylamide, vinyl acetate, vinylpyridine, vinyl ketone, vinyl chloride, vinylidene chloride, vinylidene fluoride and the like. The methacrylic acid ester polymer block (b1) can be formed by copolymerizing these monomers other than methacrylic acid ester alone or in combination of two or more with the aforementioned methacrylic acid ester.

The methacrylic acid ester polymer block (b1) is preferably composed of a polymer having a refractive index in the range of 1.485 to 1.495 in view of increasing the transparency of the methacrylic resin composition.

The weight average molecular weight of the methacrylic acid ester polymer block (b1) is preferably not less than 5,000 and not more than 150,000, more preferably not less than 8,000 and not more than 120,000, and even more preferably not less than 12,000 and not more than 100,000.

In a case where two or more methacrylic acid ester polymer blocks (b1) are present in the block copolymer (B), the compositional ratios and the molecular weights of structural units which constitute the corresponding methacrylic acid ester polymer blocks (b1) may be the same each other, or may be different from each other.

The largest weight average molecular weight $Mw_{(b1)}$ among the methacrylic acid ester polymer blocks (b1) is preferably not less than 12,000 and not more than 150,000, more preferably not less than 15,000 and not more than 120,000, and even more preferably not less than 20,000 and not more than 100,000. In a case where only one methacrylic acid ester polymer block (b1) is present in the block copolymer (B), the weight average molecular weight of the methacrylic acid ester polymer block (b1) is taken as $Mw_{(b1)}$. Moreover, in a case where two or more methacrylic acid ester polymer blocks (b1) are present in the block copolymer (B), and the two or more methacrylic acid ester polymer blocks (b1) have the same weight average molecular weights each other, that weight average molecular weight is taken as $Mw_{(b1)}$.

In the methacrylic resin composition used for the present invention, the ratio of the weight average molecular weight $Mw_{(A)}$ of the methacrylic resin (A) relative to $Mw_{(b1)}$, i.e., $Mw_{(A)}/Mw_{(b1)}$ is not less than 0.5 and not more than 2.3, preferably not less than 0.6 and not more than 2.1, more preferably not less than 0.7 and not more than 1.9. In a case where $Mw_{(A)}/Mw_{(b1)}$ is less than 0.5, the impact resistance and surface smoothness of a formed article produced from the methacrylic resin composition tend to be decreased. On the other hand, in a case where $Mw_{(A)}/Mw_{(b1)}$ is too large, the surface smoothness and the temperature dependence of haze of a formed article produced from the methacrylic resin composition tend to be decreased. In a case where $Mw_{(A)}/Mw_{(b1)}$ falls within the above range, the dispersed particle diameter of the block copolymer (B) in the methacrylic resin (A) is small, leading to a low haze regardless of temperature change. This appears to be responsible for a small change in haze over the wide range of temperature.

The proportion of the methacrylic acid ester polymer block (b1) in the block copolymer (B) is preferably not less than 40% by mass and not more than 90% by mass, and more preferably not less than 45% by mass and not more than 80% by mass in view of the transparency, surface hardness, forming processability, surface smoothness of the methacrylic resin composition according to the present invention or a formed article produced therefrom. In a case where two or more methacrylic acid ester polymer blocks (b1) are contained in the block copolymer (B), the above proportion is computed based on the total mass of all of the methacrylic acid ester polymer blocks (b1).

The acrylic acid ester polymer block (b2) has a structural unit derived from acrylic acid ester as the main structural unit. The percentage of a structural unit derived from acrylic acid ester in the acrylic acid ester polymer block (b2) is preferably not less than 45% by mass, more preferably not less than 50% by mass, even more preferably not less than 60% by mass, and in particular preferably not less than 90% by mass.

Examples of the acrylic acid ester include methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, allyl acrylate and the like. The acrylic acid ester polymer block (b2) can be formed by polymerizing these acrylic acid esters alone or in combination of two or more.

The acrylic acid ester polymer block (b2) may comprise a structural unit derived from a monomer other than acrylic acid ester as long as the objectives and effects of the present invention are not impaired. The proportion of a structural unit derived from a monomer other than acrylic acid ester contained in the acrylic acid ester polymer block (b2) is not more than 55% by mass, more preferably not more than 50% by mass, even more preferably not more than 40% by mass, and in particular preferably not more than 10% by mass.

Examples of the aforementioned monomer other than acrylic acid ester can include methacrylic acid esters, unsaturated carboxylic acids, aromatic vinyl compounds, olefins, conjugated dienes, acrylonitrile, methacrylonitrile, acrylamide, methacrylamide, vinyl acetate, vinylpyridine, vinyl ketone, vinyl chloride, vinylidene chloride, vinylidene fluoride and the like. The acrylic acid ester polymer block (b2) can be formed by copolymerizing these monomers other than acrylic acid ester alone or in combination together with the foregoing acrylic acid ester.

The acrylic acid ester polymer block (b2) preferably comprises acrylic acid alkyl ester and aromatic (meth)acrylic acid ester in view of increasing the transparency of the methacrylic resin composition used for the present invention and the like.

Examples of acrylic acid alkyl ester can include methyl acrylate, ethyl acrylate, isopropyl acrylate, n-butyl acrylate, 2-ethylhexyl acrylate, dodecyl acrylate and the like. Among these, n-butyl acrylate, 2-ethylhexyl acrylate are prepared.

The term aromatic (meth)acrylic acid ester means aromatic acrylic acid ester or aromatic methacrylic acid ester, in which a compound comprising an aromatic ring is bonded to (meth)acrylic acid via an ester bond. Examples of the aromatic (meth)acrylic acid ester can include phenyl acrylate, benzyl acrylate, phenoxyethyl acrylate, styryl acrylate, phenyl methacrylate, benzyl methacrylate, phenoxyethyl methacrylate, styryl methacrylate and the like. Among these, preferred are phenyl methacrylate, benzyl methacrylate, phenoxyethyl methacrylate, benzyl acrylate.

In a case where the acrylic acid ester polymer block (b2) comprises acrylic acid alkyl ester and aromatic (meth)acrylic acid ester, that acrylic acid ester polymer block (b2) preferably comprises 50 to 90% by mass of a structural unit derived from acrylic acid alkyl ester and 50 to 10% by mass of a structural unit derived from aromatic (meth)acrylic acid ester, and more preferably comprises 60 to 80% by mass of a structural unit derived from acrylic acid alkyl ester and 40 to 20% by mass of a structural unit derived from aromatic (meth)acrylic acid ester.

The acrylic acid ester polymer block (b2) is preferably composed of a polymer having a refractive index in the range of 1.485 to 1.495 in view of increasing the transparency of the methacrylic resin composition.

The weight average molecular weight of the acrylic acid ester polymer block (b2) is not less than 5,000 and not more than 120,000, preferably not less than 15,000 and not more than 110,000, and more preferably not less than 30,000 and not more than 100,000.

In a case where two or more acrylic acid ester polymer blocks (b2) are present in the block copolymer (B), the compositional ratios and the molecular weights of structural units which constitute the corresponding acrylic acid ester polymer blocks (b2) may be the same each other, or may be different from each other.

The largest weight average molecular weight $Mw_{(b2)}$ among the acrylic acid ester polymer blocks (b2) is not less than 30,000 and not more than 120,000, preferably not less than 40,000 and not more than 110,000, and more preferably not less than 50,000 and not more than 100,000. In a case where $Mw_{(b2)}$ is small, the impact resistance of a formed article produced from the methacrylic resin composition tends to be decreased. On the other hand, in a case where $Mw_{(b2)}$ is large, the surface smoothness of a formed article produced from the methacrylic resin composition tends to be decreased. In a case where only one acrylic acid ester polymer block (b2) is present in the block copolymer (B), the weight average molecular weight of the acrylic acid ester polymer block (b2) is taken as $Mw_{(b2)}$. Further, in a case where two or more acrylic acid ester polymer blocks (b2) are present in the block copolymer (B), and the two or more acrylic acid ester polymer blocks (b2) have the same weight average molecular weight each other, that weight average molecular weight is taken as $Mw_{(b2)}$.

Note that the weight average molecular weight of the methacrylic acid ester polymer block (b1) and the weight average molecular weight of the acrylic acid ester polymer block (b2) are values calculated from the weight average molecular weights of an intermediate product and an final product (the block copolymer (B)) measured after sampled during and after polymerization in a manufacturing process of the block copolymer (B).

Each weight average molecular weight is presented in terms of the polystyrene standard as measured by GPC (gel permeation chromatography).

The proportion of the acrylic acid ester polymer block (b2) in the block copolymer (B) is preferably not less than 10% by mass and not more than 60% by mass, more preferably not less than 20% by mass and not more than 55% by mass in view of the transparency, surface hardness, forming processability, and surface smoothness. In a case where the proportion of the acrylic acid ester polymer block (b2) in the block copolymer (B) falls within the aforementioned range, the film according to the present invention will be excellent in transparency, surface hardness, forming processability, surface smoothness and the like, and will be excellent in mirror gloss even after a metal deposition layer is provided. In a case where two or more acrylic acid ester polymer blocks (b2) are contained in the block copolymer (B), the aforementioned proportion is computed based on the total mass of all of the acrylic acid ester polymer blocks (b2).

The block copolymer (B) is not particularly limited by the linkage manner of the methacrylic acid ester polymer block (b1) and the acrylic acid ester polymer block (b2). Examples can include block copolymers having structures in which the methacrylic acid ester polymer block (b1) is linked to the acrylic acid ester polymer block (b2) in series, such as those in which one end of the acrylic acid ester polymer block (b2) is linked to one end of the methacrylic acid ester polymer block (b1) (diblock copolymers with a structure of (b1)-(b2)); those in which one end of the acrylic acid ester polymer block (b2) is linked to each of the both end of the methacrylic acid ester polymer block (b1) (triblock copolymers with a structure of (b2)-(b1)-(b2)); those in which one end of the methacrylic acid ester polymer block (b1) is linked to each of the both end of the acrylic acid ester polymer block (b2) (triblock copolymers with a structure of (b1)-(b2)-(b1)).

Further, examples include star block copolymers such as block copolymers in which one ends of two or more block copolymers having the (b1)-(b2) structure are linked to form a radial structure (the $[(b1)-(b2)-]_n$ X structure), block copolymers in which one ends of two or more block copolymers having the (b2)-(b1) structure are linked to forma radial structure (the $[(b2)-(b1)-]_n$ X structure), block copolymers in which one ends of two or more block copolymers having the (b1)-(b2)-(b1) structure are linked to form a radial structure (the $[(b1)-(b2)-(b1)-]_n$ X structure), block copolymers in which one ends of two or more block copolymers having the (b2)-(b1)-(b2) structure are linked to forma radial structure (the $[(b2)-(b1)-(b2)-]_n$ X structure); block copolymers having branched structures; and the like. Note that X herein represents a coupling agent residue.

Among these, diblock copolymers and triblock copolymers are preferred, and diblock copolymers with the (b1)-(b2) structure are more preferred.

Further, the block copolymer (B) may comprise a polymer block (b3) in addition to the methacrylic acid ester polymer block (b1) and the acrylic acid ester polymer block (b2).

The main structural unit which constitutes the polymer block (b3) is derived from a monomer other than methacrylic acid ester and acrylic acid ester. Examples of the aforementioned monomer can include, for example, olefins such as ethylene, propylene, 1-butene, isobutylene, 1-octene or the like; conjugated dienes such as butadiene, isoprene, myrcene or the like; aromatic vinyl compounds such as styrene, α-methylstyrene, p-methylstyrene, m-methyl styrene or the like; vinyl acetate, vinylpyridine, acrylonitrile, methacrylonitrile, vinyl ketone, vinyl chloride, vinylidene chloride, vinylidene fluoride, acrylamide, methacrylamide, ε-caprolactone, valerolactone and the like.

There is no particular limitation for the linkage manner of the methacrylic acid ester polymer block (b1), the acrylic acid ester polymer block (b2) and the polymer block (b3) in the block copolymer (B). Examples of the linkage manner of the methacrylic acid ester polymer block (b1), the acrylic acid ester polymer block (b2) and the polymer block (b3) can include, for example, block copolymers with the (b1)-(b2)-(b1)-(b3) structure, block copolymers with the (b3)-(b1)-(b2)-(b1)-(b3) structure and the like. In a case where two or more polymer blocks (b3) are present in the block copolymer (B), the compositional ratios and the molecular weights of structural units which constitutes the corresponding polymer blocks (b3) may be the same each other, or may be different from each other.

The block copolymer (B) may have a functional group such as a hydroxyl group, a carboxyl group, acid anhydride group, an amino group in the molecular chain or at an end of the molecular chain as appropriate.

The weight average molecular weight $Mw_{(B)}$ of the block copolymer (B) is preferably not less than 52,000 and not more than 400,000, more preferably not less than 60,000 and not more than 300,000.

In a case where the weight average molecular weight of the block copolymer (B) is small, sufficient melt tension cannot be retained in melt extrusion forming, and thus a good film may not easily be obtained. Further, mechanical properties such as rupture strength of the resulting film tend to be decreased. On the other hand, in a case where the weight average molecular weight of the block copolymer (B) is large, the viscosity of a molten resin increases, and fine grain-like unevenness and pimples resulted from unmolten materials (materials having high molecular weight) may be on the surface of a film obtained by melt extrusion forming, and a good film tends not to be easily obtained.

Further, the molecular weight distribution of the block copolymer (B) is preferably not less than 1.0 and not more than 2.0, more preferably not less than 1.0 and not more than 1.6. In a case where the molecular weight distribution falls within the above ranges, the mechanical properties and thermal resistance of the acrylic resin film according to the present invention can be maintained at a high level.

Note that the weight average molecular weight and the number average molecular weight are in terms of the polystyrene standard as measured by GPC (gel permeation chromatography).

The refractive index of the above block copolymer (B) is preferably 1.485 to 1.495, more preferably 1.487 to 1.493. In a case where the refractive index falls within the range, the methacrylic resin composition is highly transparent. Note that the term "refractive index" as used herein means a value measured at a measurement wavelength of 587.6 nm (d ray) in accordance with Examples as described below.

There is no particular limitation for method for manufacturing the block copolymer (B), and any methods similar to the known approaches can be used. For example, usually used is a method comprising living polymerization of monomers constituting each polymer block. Examples of the aforementioned approach of living polymerization can include, for example, a method comprising anionic polymerization in the presence of a mineral acid salt such as an alkaline metal salt or an alkaline earth metal salt using an organic alkali metal compound as a polymerization initiator; a method comprising anionic polymerization in the presence of an organoaluminium compound using an organic alkali metal compound as a polymerization initiator; a method comprising polymerization using an organic rare-earth metal complex as a polymerization initiator; a method comprising radical polymerization in the presence of a copper compound using α-halogenated ester compound as an initiator; and the like. Further, mentioned can be a method in which a mixture comprising the block copolymer (B) used for the present invention is manufactured by polymerizing monomers constituting each block using a multivalent radical polymerization initiator or a multivalent radical chain transfer agent; and the like. Among these methods, in particular, a method comprising anionic polymerization in the presence of an organoaluminium compound using an organic alkali metal compound as a polymerization initiator is preferred in view of that the block copolymer (B) can be obtained with high purity, and the molecular weight and the compositional ratio can easily be controlled, and in view of low cost.

The acrylic resin film according to the present invention preferably comprises 50 to 99 parts by mass of the methacrylic resin (A) and 50 to 1 part by mass of the block copolymer (B), and preferably comprises 55 to 90 parts by mass of the methacrylic resin (A) and 45 to 10 parts by mass of the block copolymer (B), and more preferably comprises 70 to 88 parts by mass of the methacrylic resin (A) and 30 to 12 parts by mass of the block copolymer (B).

In a case where the content of the methacrylic resin (A) in the acrylic resin film is smaller than that of the block copolymer (B), the surface hardness of a film obtained by melt extrusion forming with a T-die tends to be decreased.

Various additives, for example, antioxidants, thermostabilizers, lubricants, processing aids, antistatic agents, antioxidizing agents, colorants, impact modifying agents and the like may be added, if desired, to the methacrylic resin composition used for the present invention as long as the effects of the present invention are not impaired. Note that a foaming agent, a filler, a delustering agent, a light diffusing agent, a softener and a plasticizer are preferably not added in a large amount in view of the mechanic properties and surface hardness of the acrylic resin film according to the present invention.

An antioxidant alone has an effect for preventing oxidation deterioration of a resin in the presence of oxygen. Examples of the antioxidant can include, for example, phosphorus antioxidants, hindered phenol antioxidants, thio-ether antioxidants and the like. These antioxidants can be used alone or in combination of two or more. Among these, phosphorus antioxidants and hindered phenol antioxidants are preferred in view of the effects for preventing deterioration of optical properties due to coloring, and a combination of a phosphorus antioxidant and a hindered phenol antioxidant is more preferred.

In a case where a phosphorus antioxidant and a hindered phenol antioxidant are used in combination, there is no particular limitation for the ratio thereof, but the mass ratio of a phosphorus antioxidant/a hindered phenol antioxidant is preferably 1/5 to 2/1, more preferably 1/2 to 1/1.

Examples of phosphorus antioxidants can include
2,2-methylene bis(4,6-di-t-butylphenyl)octyl phosphite (Adeka Corp., Product name: ADK STAB HP-10), tris(2,4-di-t-butylphenyl)phosphite (BASF A.G.; Product name: IRGAFOS 168) and the like.

Examples of hindered phenol antioxidants can include
pentaerythrityl-tetrakis[3-(3,5-di-t-butyl-4-hydroxy phenyl) propionate] (BASF A.G.; Product name IRGANOX 1010),
octadecyl-3-(3,5-di-t-butyl-4-hydroxyphenyl)propionate (BASF A.G.; Product name IRGANOX 1076),
3,9-bis(2,6-di-tert-butyl-4-methylphenoxy)-2,4,8,10-tetroxa-3,9-diphosphaspiro[5.5]undecane (Adeka Corp., Product name: ADK STAB PEP-36) and the like.

A thermal deterioration inhibitor can prevent thermal deterioration of a resin by capturing polymer radicals generated upon exposure to high temperature in the substantially absence of oxygen.

Examples of the thermal deterioration inhibitors can include
2-t-butyl-6-(3'-t-butyl-5'-methyl-hydroxybenzyl)-4-methyl-phenyl acrylate (Sumitomo Chemical Co., Ltd.; Product name Sumilizer GM),
2,4-di-t-amyl-6-(3',5'-di-t-amyl-2'-hydroxy-α-methyl benzyl)phenyl acrylate (Sumitomo Chemical Co., Ltd.; Product name Sumilizer GS) and the like.

An ultraviolet absorber is a compound capable of absorbing ultraviolet light. The ultraviolet absorber is a compound which is said to have a function for mainly converting light energy into thermal energy.

Examples of ultraviolet absorbers can include benzophenones, benzotriazols, triazines, benzoates, salicylates, cyanoacrylates, oxalic anilides, malonic esters, formamidines and the like. These can be used alone or in combination of two or more. Among these, benzotriazols and triazines are preferred in view of compatibility with a resin in which resin deterioration due to ultraviolet irradiation can be suppressed.

Examples of benzotriazols can include
2,2'-methylenebis[4-(1,1,3,3-tetramethylbutyl)6-(2H-benzotriazol-yl)phenol] (Asahi Denka Kogyo K.K.; Product name ADK STAB LA-31),
2-(2H-benzotriazol-2-yl)-4-(1,1,3,3-tetramethylbutyl) phenol (Ciba Specialty Chemicals Co. Ltd.; Product name TINUVIN 329),
2-(2H-benzotriazol-2-yl)-4,6-bis(1-methyl-1-phenylethyl) phenol (Ciba Specialty Chemicals Co. Ltd.; Product name TINUVIN 234) and the like.

Examples of triazines can include
2,4-bis(2-hydroxy-4-butyloxyphenyl)-6-(2,4-butyloxyphenyl)-1,3,5-triazine (BASF A.G.: Product name Tinuvin 460) and the like.

A light stabilizer is a compound referred to as having a function to capture radicals generated by mainly light oxidation. Examples of suitable light stabilizers can include hindered amines such as compounds having a 2,2,6,6-tetraalkylpiperidine backbone, and the other compounds.

A polymer processing aid is a compound capable of producing an effect on thickness precision and thinning when shaping a methacrylic resin composition. A polymer processing aid comprises polymer particles having a particle diameter of 0.05 to 0.5 μm which can usually be manufactured by an emulsion polymerization.

The above polymer particles may be mono-layered particles comprising a polymer having a single compositional ratio and single limiting viscosity, or may be multi-layered particles comprising two or more polymers having different compositional ratios or limiting viscosities. Among these, preferably mentioned are two-layered particles comprising an inner polymer layer having a low limiting viscosity and an outer polymer layer having a high limiting viscosity of not less than 5 dl/g.

A polymer processing aid has a limiting viscosity of preferably 3 to 6 dl/g. In a case where the limiting viscosity is too small, an effect for improving formability is low. In a case where the limiting viscosity is too large, the melt fluidity of a methacrylic resin composition tends to be decreased.

As a specific example of a polymer processing aid, Metablen P530A, P550A, P570A from Mitsubishi Rayon Co., Ltd.; Paraloid K125 from Rohm & Haas Co.; and the like can suitably be used.

Further, in the methacrylic resin composition used for the present invention, another polymer in addition to the methacrylic resin (A) and the block copolymer (B) can be mixed in an amount where the effects of the present invention are not impaired. Examples of the aforementioned other polymer can include polyolefin resins such as polyethylene, polypropylene, polybutene-1, poly-4-methylpentene-1, polynorbornene or the like; ethylenic ionomer; styrene based resins such as polystyrene, styrene-maleic anhydride copolymer, high impact polystyrene, AS resin, ABS resin, AES resin, AAS resin, ACS resin, MBS resin or the like; methyl methacrylate-styrene copolymer; polyester resins such as polyethylene terephthalate, polybutylene terephthalate or the like; polyamides such as Nylon 6, Nylon 66, polyamide elastomers or the like; polycarbonate, polyvinyl chloride, polyvinylidene chloride, polyvinyl alcohol, ethylene-vinyl alcohol copolymer, polyacetal, polyvinylidene fluoride, polyurethane, modified polyphenylene ether, polyphenylene sulfide, silicone modified resin; acrylic rubber, silicone rubber; styrene based thermoplastic elastomers such as SEPS, SEBS, SIS or the like; olefin based rubbers such as IR, EPR, EPDM; and the like.

There is no particular limitation for methods for preparing a thermoplastic polymer composition used for the present invention. However, recommend is, for example, a method in which melt kneading is performed for mixing in order to improve the dispersibility of each component constituting the above thermoplastic polymer composition. In a method comprising melt-kneading the methacrylic resin (A) and the block copolymer (B), if desired, an additive may be mixed with these at the same time. Or the methacrylic resin (A) may be mixed with an additive and then mixed with the block copolymer (B). Mixing operations may be performed, for example, with known mixing or kneading devices such as kneader-ruders, extruders, roll mills, Banbury mixers or the like. In particular, a twin screw extruder is preferably used in view of increasing the kneadability and compatibility of the methacrylic resin (A) and the block copolymer (B). The temperature at the time of mixing•kneading may be appropriately adjusted, depending on the melting temperatures and the like of the methacrylic resin (A), the block copolymer (B) and the like to be used. And the mixing may be performed at a temperature within the range of usually 110° C. to 300° C. In a case where melt kneading is performed with a twin screw extruder, a vent is preferably used to perform melt kneading under reduced pressure and/or under nitrogen stream. Thus, the acrylic resin composition according to the present invention can be obtained in any form such as pellets, powder or the like. The acrylic resin composition in a form of pellets, powder and the like is suitable for use as a forming material.

Alternatively, the thermoplastic polymer composition used for the present invention comprising the block copolymer (B) can be prepared by dissolving the block copolymer (B) in a mixed solution of an acrylic monomer constituting a monomer unit of the methacrylic resin (A) and a solvent such as toluene or the like, and then polymerizing the above acrylic monomer.

The acrylic resin film according to the present invention can be manufactured according to the known method such as T-die method, inflation method, melt casting method, calendering method or the like. A method is preferred comprising the steps of extruding the above melt-kneaded material in a molten state through a T-die, and allowing the both surfaces thereof to make contact with the surface of a mirrored roll or the surface of a mirrored belt to perform forming. In this case, a roll or a belt to be used is preferably made of metal. In a case where film-forming is performed by allowing the both surfaces of the melt-kneaded material extruded as described above to make contact with mirrored surfaces, the both surfaces of a film is preferably pressed and sandwiched between mirrored rolls or mirrored belts. A higher sandwiching pressure against mirrored rolls or mirrored belts is preferred, and the pressure is preferably not less than 10 N/mm, and more preferably not less than 30 N/mm in a linear pressure.

In the case of the manufacturing method by the T-die method, extruder-type melt extruding equipment having single extrusion screw or twin extrusion screws and the like can be used. The melt extrusion temperature for manufacturing the film according to the present invention is preferably 200 to 300° C., more preferably 220 to 270° C. Further, in a case where melt extrusion is performed with melt extruding equipment, a vent is preferably used to perform melt extrusion under reduced pressure or under nitrogen stream.

Further, in view of obtaining a film having good surface smoothness, good surface gloss and low haze, it is preferred that the surface temperature of at least one of mirrored rolls or mirrored belts used for sandwiching a film is not less than 60° C., and the surface temperatures of both of mirrored rolls or mirrored belts used for sandwiching a film are not more than 130° C. In a case where the surface temperatures of both of mirrored rolls or mirrored belts used for sandwiching a film are less than 60° C., the surface smoothness and haze of the resulting acrylic resin film tend to be insufficient. In a case where the surface temperature of at least one of mirrored rolls or mirrored belts is more than 130° C., a film is too tightly made contact to mirrored rolls or mirrored belts, and the surface of the film tends to be roughened when detaching the film from the mirrored rolls or mirrored belts. Therefore, the resulting acrylic resin film tends to have a decreased surface smoothness or an increased haze.

The roughness of at least one surface of the acrylic resin film according to the present invention is not more than 1.5 nm, and preferably 0.1 to 1.0 nm. This can lead to an excellent surface smoothness and an excellent handling property when cutting and punching, and also lead to an excellent surface gloss when utilized for uses requiring designability. Further, an excellent vividness of a patterned layer can be obtained when printing is performed on the acrylic resin film according to the present invention. Moreover, in the case of optical uses, it will be excellent in optical properties such as light transmittance and shape-forming precision when a surface is subjected to shape-forming. Note that the roughness of a film is expressed in a value as determined by the method described in Example.

The haze of the acrylic resin film according to the present invention is preferably not more than 0.3%, more preferably not more than 0.2% at a thickness of 75 μm. This can lead to an excellent handling property when cutting and punching, and also lead to an excellent surface gloss when utilized for uses requiring designability and an excellent vividness of a patterned layer printed on the acrylic resin film according to the present invention. Moreover, in the case of optical uses such as liquid crystal protective films, light guide films or the like, it is preferred because the usage efficiency of a light source is enhanced. Furthermore, it is preferred because shape-forming precision is excellent when a surface is subjected to shape-forming.

Further, the temperature dependence of the haze of the acrylic resin film according to the present invention is preferably smaller. Advantageously, this can lead to unimpaired transparency when utilized for uses requiring transparency over a wider range of temperature, and when utilized at high temperature.

The thickness of the acrylic resin film according to the present invention is preferably not more than 500 μm. In a case where the thickness is more than 500 μm, secondary processabilities such as laminating properties, handling properties, cutting/punching properties are decreased, resulting in a film difficult to be used, and also resulting in an increased price per unit area. These are economically disadvantageous, and thus not preferred. The thickness of the aforementioned film is more preferably 40 to 300 μm, and in particular preferably 50 to 200 μm.

The acrylic resin film according to the present invention may be subjected to stretching. The stretching can produce a film having enhanced mechanical strength and cracking resistance. There is no particular limitation for the stretching methods, and they can include simultaneous biaxial stretching method, sequential biaxial stretching method, tubular stretching method, rolling method and the like. For the temperature at the time of stretching, the lower limit is higher by 5° C. than the glass transition temperature of the methacrylic resin and the upper limit is higher by 40° C. than the glass transition temperature of the methacrylic resin in view of that uniform stretching can be performed and a high-strength film can be obtained. In a case where the stretching temperature is too low, a stretched article may easily undergo breakage during stretching. In a case where the stretching temperature is too high, the effects of stretching tends not to be fully obtained, resulting in a stretched article with a less enhanced strength. Stretching is usually performed at 100 to 5000%/min. In a case where the stretching rate is low, a higher strength may not be easily obtained, and productivity may also be decreased. Further, in a case where the stretching rate is high, uniform stretching may be difficult due to breakage and the like of a stretched article. So, heat fixation is preferably performed after stretching. The heat fixation can produce a film less susceptible to thermal shrinkage. The thickness of a film obtained by stretching is preferably 10 to 200 µm.

The acrylic resin film according to the present invention may be colored. Examples of coloring methods can include a method comprising making a pigment or a dye contained in a composition comprising the methacrylic resin (A) and the block copolymer (B) to give color to the resin itself before film-forming; a staining method comprising immersing an acrylic resin film in a dye-dispersed liquid to perform coloring, but they are not particularly limited to these.

At least one surface of the acrylic resin film according to the present invention may be subjected to printing. Patterns such as pictures, characters, figures or the like, and colors may be given by printing. Patterns may be chromatic or achromatic. Printing is preferably performed on a surface contacting with another thermoplastic or thermosetting resin described below in order to prevent color degradation of the printing layer.

The acrylic resin film according to the present invention has a surface hardness of preferably HB or harder, more preferably F or harder, and still more preferably H or harder in terms of the JIS pencil hardness (thickness: 75 µm). The acrylic resin film with a hard surface according to the present invention is less susceptible to scratching, and therefore suitably used as a decorative and protective film for a surface of a formed article requiring designability.

(Laminate Film)

In the laminate film according to the present invention, at least one layer comprising metal and/or metal oxide or at least one other thermoplastic resin layer is placed on at least one surface of the above-mentioned acrylic resin film according to the present invention in a direct manner or via an adhesive layer. Alternatively, in the laminate film according to the present invention, a base material layer comprising a thermoplastic resin, a wooden base material, a non-wood fiber such as kenaf fiber may be placed on at least one surface of the above-mentioned acrylic resin film according to the present.

The thickness of the laminate film according to the present invention is preferably not more than 500 µm.

Examples of the other thermoplastic resin suitable for lamination can include polycarbonate resin, polyethylene terephthalate resin, polyamide resin, polyethylene resin, polypropylene resin, polystyrene resin, polyvinyl chloride resin, other (meth)acrylic resins, ABS (acrylonitrile-butadiene-styrene copolymer) resin, ethylene-vinyl alcohol resin, polyvinyl butyral resin, polyvinyl acetal resin, styrene thermoplastic elastomers, olefin thermoplastic elastomers, acrylic thermoplastic elastomers and the like.

There is no particular limitation for methods of manufacturing the laminate film. Examples can include (1) a method comprising separately preparing the acrylic resin film according to the present invention and another thermoplastic resin film, and continuously performing lamination of the films between heating rollers, thermocompression bonding of the films with plate press, pressure or vacuum lamination forming, or wet lamination intermediating an adhesive layer between the films; (2) a method comprising extruding another thermoplastic resin through a T-die for layering the thermoplastic resin on the acrylic resin film according to the present invention as abase material; (3) a method comprising co-extruding a mixture of the above-mentioned methacrylic resin (A) and the above-mentioned block copolymer (B) with another thermoplastic resin, thereby obtaining a laminate film comprising a layer of the acrylic resin film according to the present invention and a layer of the thermoplastic resin; and the like.

In the case of the method (1) or (2) among these methods, surface treatment such as corona treatment may be performed on a bonding surface of the acrylic resin film according to the present invention or the other thermoplastic resin film before performing the lamination.

In the laminate film according to the present invention comprising a layer comprising metal and/or a metal oxide, for example, aluminum, silicon, magnesium, palladium, zinc, tin, nickel, silver, copper, gold, indium, stainless steel, chromium, titanium or the like can be used as the metal, or for example, aluminum oxide, zinc oxide, antimony oxide, indium oxide, calcium oxide, cadmium oxide, silver oxide, gold oxide, chrome oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, barium oxide or the like can be used as the metal oxide. These metals and metal oxides may each be used alone or as a mixture of two or more. Among these, indium is preferred because it has excellent designability, and glossiness is not easily lost even in a case where the resulting laminated article is subjected to deep drawing forming. Alternatively, in a case where deep drawing is not particularly required, aluminum is particularly preferred because it has excellent designability, and is available at low cost even industrially. The vacuum deposition method is usually used as a method for providing a layer of the metal and/or the metal oxide. The ion plating method, the sputtering method, the CVD (Chemical Vapor Deposition) method may also be used. The thickness of a vapor deposited film comprising metal and/or metal oxide is generally about 5 to 100 nm. In a case where deep drawing is performed after layer-formation, it is preferably 5 to 250 nm.

In the laminate film according to the present invention, the acrylic resin film according to the present invention may be used for an inner layer or a portion thereof of the laminate film, or may be used for an outermost layer. There is no particular limitation for the number of layers in a laminate film. Transparent resins such as methacrylic resins or the like are preferred for the other resin used in the laminate film in view of designability. The outermost layer preferably has high surface hardness and high weather resistance in view of a higher scratching resistance of a film and a long lasting designability. For example, a film comprising a methacrylic resin or the acrylic thermoplastic resin film according to the present invention is preferred for the outermost layer.

(Laminated Product)

The laminated product according to the present invention is a product in which the acrylic resin film according to the present invention or the laminate film according to the present invention is placed on a surface of another thermoplastic resin, thermosetting resin, wood base material or non-wood fiber base material.

Examples of the other thermoplastic resin suitable for used in the above laminated product can include polycarbonate resin, polyethylene terephthalate resin, polyamide resin, polyethylene resin, polypropylene resin, polystyrene resin, polyvinyl chloride resin, other (meth)acrylic resins, ABS (acrylonitrile-butadiene-styrene copolymer) resin, ethylene-vinyl alcohol resin, polyvinyl butyral resin, polyvinyl acetal resin, styrene thermoplastic elastomer, olefin thermoplastic elastomer, acrylic thermoplastic elastomer and the like. Examples of the other thermosetting resin can include epoxy resin, phenol resin, melamine resin and the like. The laminated product according to the present invention may be a product in which the acrylic resin film according to the present invention or the laminate film according to the present invention is placed on a surface of a wooden base material or a base material comprising non-wood fiber such as kenaf fiber or the like.

There is no particular limitation for methods of manufacturing the laminated product according to the present invention. For example, the laminated product according to the present invention can be obtained by performing, while heating, vacuum forming, pressure forming or compression forming of the acrylic resin film according to the present invention or the laminate film according to the present invention on a surface of another thermoplastic or thermosetting resin or on a surface of a wooden base material or a non-wood fiber base material. In the laminated product according to the present invention, the acrylic resin film according to the present invention or the laminate film according to the present invention is placed on the outermost surface of a formed article or a base material, thereby leading to excellent surface smoothness, surface hardness, surface gloss and the like. Furthermore, in a case where printing is performed on the acrylic resin film according to the present invention, vivid patterns and the like will be shown. Moreover, mirror glossiness comparable with that of metal will be given to a laminate film having a metal layer.

Among the methods of manufacturing the laminated product according to the present invention, preferred is a method commonly called the injection molding and in-mold laminating method.

The above injection molding in-mold laminating method comprises inserting the acrylic resin film according to the present invention or the laminate film according to the present invention between male and female molds for injection molding, and injecting a molten thermoplastic resin into the molds from the side of one surface of the above film, thereby forming an injection-molded article and laminating the above film on the injection-molded article simultaneously.

A flat film may directly be inserted into a mold, or a film subjected to preforming into a concavo-convex shape by vacuum forming, pressure forming or the like may be inserted into a mold. Preforming of a film may be performed with another forming machine or may be performed inside a mold in an injection molding machine used for the injection-molding and in-mold laminating method. The latter method, i.e., a method comprising preforming a film and then injecting a molten resin onto one surface of that film is called the insert molding method.

In a case where the laminate film according to the present invention is used for the film, it is preferably arranged so that the layer of another thermoplastic resin is placed to the side of a resin to be injected, i.e., so that the acrylic resin film according to the present invention serves as the outermost surface. A laminated product in which the acrylic resin film according to the present invention is placed at the outermost surface can be obtained as described above.

By taking advantage of good handling properties, good surface smoothness and high surface hardness, the acrylic resin film, laminate film or laminated product according to the present invention is suitably used for formed articles requiring designability or formed articles requiring advanced optical properties, i.e., signboard components such as advertising pillar, stand signboard, side signboard, transom signboard, roof signboard or the like; display components such as showcase, divider panel, store display or the like; illumination components such as a fluorescent lamp cover, mood lighting cover, lamp shade, luminous ceiling, luminous wall, chandelier or the like; interior design components such as furniture, pendant, mirror or the like; building components such as door, dome, safety window glass, partition, staircase wainscot, balcony wainscot, roof of leisure building or the like; transportation-related components such as airplane windshield, pilot visor, windshield for motorcycle and motorboat, sun visor for bus, side visor for automobile, rear visor for automobile, head wing for automobile, headlight cover for automobile, automobile interior members, or automobile exterior members such as bumper or the like; electronics components such as nameplate for audiovisual system, stereo cover, television protective mask, vending machine, cellular phone, personal computer or the like; medical device-related components such as incubator, X-ray parts or the like; device-related components such as machine cover, instrument cover, experimental device, ruler, dial, observation window or the like; traffic-related components such as road sign, direction board, convex traffic mirror, highway noise barrier or the like; and, in addition, greenhouse, large-sized tank, box water tank, bathroom members, clock panel, bath tub, sanitary, desk mat, gaming machine components, toy, a decorative and protective film for the surface of a face protection mask when welding, wallpaper; marking film; optics-related components such as liquid crystal protective film, light guide film, Fresnel's lens, lenticular lens, a front film of various displays, diffusion film; and the like.

EXAMPLES

The present invention will be described in more detail with reference to Examples and Comparative Examples. Note that the present invention shall not be limited to the following Examples. Moreover, the present invention encompass all of aspects in which items of technical features such as characteristic values, forms, manufacturing methods, uses as described above are combined in any combinations.

Values of physical properties and the like in Examples and Comparative Examples were determined by the following methods.

[Weight Average Molecular Weight (Mw) and Molecular Weight Distribution]

The weight average molecular weights (Mw) and the molecular weight distributions during and after polymerization of the block copolymer (B) and the methacrylic resin (A) were determined by GPC (gel permeation chromatography) in terms of polystyrene-based molecular weight.

Equipment: a TOSOH GPC system "HLC-8320"
Separation column: "TSKguardcolum Super HZ-H", "TSKgel HZM-M" and "TSKgel Super HZ4000" from TOSOH CORP, serially connected
Eluent: tetrahydrofuran
Eluent flow rate: 0.35 ml/min.
Column temperature: 40° C.
Detection method: differential refractive index (RI)

[Compositional Ratio of Each Polymer Block]

The compositional ratio of each polymer block was determined by $^1$H-NMR ($^1$H-nuclear magnetic resonance) measurements.

Equipment: a nuclear magnetic resonance system "JNM-LA400" from JEOL Co., Ltd.
Deuterated solvent: deuterated chloroform

[Refractive Index of Block Copolymer (B)]

A 3 cm×3 cm sheet with a thickness of 3 mm was prepared by press forming, and measured for refractive index at a measurement wavelength of 587.6 nm (d ray) at 23° C. using "KPR-200" from Kalnew Optical Industrial Co., Ltd.

[Film Haze]

Extrusion was performed through a die with a width of 900 mm at an extrusion temperature of 250° C. at an extrusion rate of 47 kg/h using a 65-mm Φ vent type single screw extruder, and metal mirrored rolls at 65° C. and 70° C. were used for nipping, and drawing was performed at 10 m/min to form a film with a thickness of 75 μm. The resulting film was cut out into 50 mm×50 mm to obtain a test piece, and haze was measured at 23° C. in according with JIS K7105.

[Pencil Hardness of Film]

A film formed according to the film-forming conditions described above was cut out into 10 cm×10 cm to obtain a test piece, and pencil hardness was measured in accordance with JIS-K5600-5-4.

[Surface Roughness (Measurement of Surface Smoothness of Film)]

A film formed according to the film-forming conditions described above was cut out into 5 mm×5 mm to obtain a test piece. The shape of a surface was measured with an atomic force microscope (SSI nanotechnology Inc., SPI4000 Probe Station E-sweep environmental control unit) in the DFM mode. SI-DF20 (back side Al) from SII nanotechnology Inc. was used as a probe. Prior to main measurements, surface roughness of a reference sample with a pitch of 10 μm and a step height of 100 nm was measured to confirm that the instrument had the measurement errors in the X-axis and Y-axis of not more than 5% in 10 μm and the measurement error in the Z-axis of not more than 5% in 100 nm.

The observation region of a sample was 5 μm×5 μm, and the measurement frequency was 0.5 Hz. The number of scanning lines was 512 in the X-axis and 512 in the Y-axis. Measurements were performed under the atmospheric environment of 25° C.±2° C. and a humidity of 30±5%. Measured data were analyzed with a data processing software accompanied with the instrument to determine the average surface roughness Ra. That is, the [Tertiary inclination compensation] command in the [Tool] menu of the measurement software in the instrument was selected to compensate the film inclination and the whole surface inclination due to large waves, and then the [Surface roughness analysis] command in the [Analysis] menu was selected to obtain the average surface roughness Ra. The average surface roughness Ra is defined as follows.

Average surface roughness Ra: a value obtained by averaging the absolute values of the deviations from the reference surface to the specified surface.

$$Ra = \frac{1}{S_0} \int_X \int_Y |F(X, Y) - Z_0| dXdY. \quad \text{[Formula 1]}$$

Wherein F(X, Y) represents a value of the height in the (X, Y) coordinate. $Z_0$ represents the average value of Z data defined below.

$$Z_0 = \frac{1}{S_0} \int_X \int_Y F(X, Y) dXdY \quad \text{[Formula 2]}$$

Further, $S_0$ represents the square measure of a measurement field.

This average surface roughness Ra was measured at ten different fields on the both sides (referred to as the A side and the B side for convenience) of a film, and the average of the ten measured values of average surface roughness Ra was taken as the film surface roughness.

Tertiary inclination compensation was performed by fitting a measured sample surface to a tertiary approximate surface estimated by the least-square method in order to eliminate the influences from the inclination and the waves of a film sample.

[Stress Whitening]

A film formed according to the forming conditions described above was used to prepare a test piece in the form of Dumbbell 1B in accordance with JIS-K7127, and stretched at a load cell of 5 kN, a distance between chucks of 110 mm and a stretching rate of 20 mm/min using an autograph (Shimadzu Corporation, Autograph AG-5 kN), and evaluated for the state of whitening just before fracture.

○: No whitening is observed
Δ: Slight whitening is observed
x: Whitening is observed

[Temperature Whitening (Temperature Dependence of Haze)]

A film formed according to the forming conditions described above was used to cut out a 50 mm×50 mm test piece, and allowed to stand for 10 minutes in an oven at 80° C. The test piece was taken out of the oven, and haze was immediately measured in accordance with JIS K7136 with a haze meter (Murakami Color Research Laboratory, a haze meter HM-150).

○: The change in haze is not more than 0.1%.
Δ: The change in haze is not more than 0.5%.
x: The change in haze is more than 0.5%.

[Mirror Glossiness of Laminate Film]

A film formed according to the film forming conditions described above was cut out into 20 cm×30 cm, and one surface thereof was subjected to corona discharge treatment, and then aluminum was vapor deposited by the vacuum deposition method to obtain a laminate film. The thickness of the aluminum layer was found to be 30 nm. Appearance evaluation was visually performed for the mirror glossiness of a non-vapor-deposited surface of the laminate film.

○: Have mirror gloss
Δ: Have slight mirror gloss
x: Have no mirror gloss

[Method of Manufacturing Laminated Product]

A laminate film obtained under the conditions described in Example 1 below was laminated onto ABS resin at a heating temperature of 160° C. using a vacuum pressure molding machine to obtain a laminated product.

In Reference Examples shown below, compounds dried and purified by the conventional method and degassed with nitrogen were used. Further, compounds were transferred and fed under the nitrogen atmosphere.

Reference Example 1 [Synthesis of Block Copolymer (B-1)]

To a three-necked flask degassed inside and purged with nitrogen, 735 g of dried toluene, 0.4 g of hexamethyltriethylenetetramine and 39.4 g of a toluene solution comprising 20 mmol of isobutylbis(2,6-di-t-butyl-4-methylphenoxy) aluminum were added at room temperature, and 1.17 mmol of sec-butyllithium was further added. To this, 35.0 g of methyl methacrylate was added, and allowed to react at room temperature for 1 hour. The polymer contained in the reaction liquid was sampled, and the weight average molecular weight (hereinafter referred to as $Mw_{(b1-1)}$) was then measured to be 40,000. The above methyl methacrylate polymer is further subjected to block copolymerization with acrylic acid ester such that the above methyl methacrylate polymer serves as a methacrylic acid ester polymer block (b1) (hereinafter referred to as the "methyl methacrylate polymer block (b1-1)").

Then, the reaction liquid was brought to −25° C., and a mixture of 24.5 g of n-butyl acrylate and 10.5 g of benzyl acrylate was added dropwise over 0.5 hour. The polymer contained in the reaction liquid was sampled immediately after dropwise addition, and the weight average molecular weight was then measured to be 80,000. Since the weight average molecular weight of the methyl methacrylate polymer block (b1-1) was 40,000, the weight average molecular weight ($Mw_{(b2)}$) of the acrylic acid ester polymer block (b2) comprising a copolymer of n-butyl acrylate and benzyl acrylate was determined to be 40,000.

Subsequently, 35.0 g of methyl methacrylate was added, and the reaction liquid was brought back to room temperature and stirred for 8 hours to form a second methacrylic acid ester polymer block (b1) (hereinafter referred to as the "methyl methacrylate polymer block (b1-2)"). Then, after adding 4 g of methanol to the reaction liquid to quench polymerization, the reaction liquid was poured to a large amount of methanol to allow the block copolymer (B) as a triblock copolymer (hereinafter referred to as the "block copolymer (B-1)") to precipitate, and then isolated by filtering and drying at 80° C. and 1 torr (about 133 Pa) for 12 hours. The weight average molecular weight $Mw_{(B)}$ of the resulting block copolymer (B-1) was found to be 120,000. Since the weight average molecular weight of the diblock copolymer was 80,000, the weight average molecular weight (referred to as $Mw_{(b1-2)}$) of the methyl methacrylate polymer block (b1-2) was determined to be 40,000. Since the weight average molecular weight $Mw_{(b1-1)}$ of the methyl methacrylate polymer block (b1-1) and the weight average molecular weight $Mw_{(b1-2)}$ of the methyl methacrylate polymer block (b1-2) are both 40,000, $Mw_{(b1)}$ is 40,000. The analysis results of the resulting block copolymer (B-1) are shown in Table 1.

Note that the structural unit derived from methyl methacrylate, the structural unit derived from n-butyl acrylate and the structural unit derived from benzyl acrylate were denoted as the "methyl methacrylate unit", the "n-butyl acrylate unit" and the "benzyl acrylate unit", respectively.

Reference Example 2 [Synthesis of Block Copolymer (B-2)]

To a three-necked flask degassed inside and purged with nitrogen, 567 g of dried toluene, 0.1 g of hexamethyltriethylenetetramine and 8.3 g of a toluene solution comprising 4.1 mmol of isobutylbis(2,6-di-t-butyl-4-methylphenoxy) aluminum were added, and 0.42 mmol sec-butyllithium was further added. To this, 33.3 g of methyl methacrylate was added, and allowed to react at room temperature for 1 hour. The polymer contained in the reaction liquid was sampled, and the weight average molecular weight (hereinafter referred to as $Mw_{(b1-1)}$) was measured to be 80,000. The above methyl methacrylate polymer is further subjected to block copolymerization with acrylic acid ester such that the above methyl methacrylate polymer serves as a methacrylic acid ester polymer block (b1) (hereinafter referred to as the "methyl methacrylate polymer block (b1-1)").

Then, the reaction liquid was brought to −25° C., and a mixture of 24.8 g of n-butyl acrylates and 8.5 g of benzyl acrylate was added dropwise over 0.5 hour. The polymer contained in the reaction liquid was sampled immediately after dropwise addition, and the weight average molecular weight was measured to be 160,000. Since the weight average molecular weight of the methyl methacrylate polymer block (b1-1) was 80,000, the weight average molecular weight ($Mw_{(b2)}$) of the acrylic acid ester polymer block (b2) comprising a copolymer of n-butyl acrylate and benzyl acrylate was determined to be 80,000.

Subsequently, 33.3 g of methyl methacrylate was added, and the reaction liquid was brought back to room temperature and stirred for 8 hours to form a second methacrylic acid ester polymer block (b1) (hereinafter referred to as the "methyl methacrylate polymer block (b1-2)"). Then, after adding 4 g of methanol to the reaction liquid to quench polymerization, the reaction liquid was poured to a large amount of methanol to allow the block copolymer (B) as a triblock copolymer (hereinafter referred to as the "block copolymer (B-2)") to precipitate, and then isolated by filtering and drying at 80° C. and 1 torr (about 133 Pa) for 12 hours. The weight average molecular weight $Mw_{(B)}$ of the resulting block copolymer (B-2) was found to be 240,000. Since the weight average molecular weight of the diblock copolymer was 160,000, the weight average molecular weight (referred to as $Mw_{(b1-2)}$) of the methyl methacrylate polymer block (b1-2) was determined to be 80,000. Since the weight average molecular weight $Mw_{(b1-1)}$ of the methyl methacrylate polymer block (b1-1) and the weight average molecular weight $Mw_{(b1-2)}$ of the methyl methacrylate polymer block (b1-2) are both 80,000, $Mw_{(b1)}$ is 80,000. The analysis results of the resulting block copolymer (B-2) are shown in Table 1.

Reference Example 3 [Synthesis of Block Copolymer (B-3)]

To a three-necked flask degassed inside and purged with nitrogen, 567 g of dried toluene, 1.52 g of hexamethyltriethylenetetramine and 8.3 g of a toluene solution comprising 15.5 mmol of isobutylbis(2,6-di-t-butyl-4-methylphenoxy) aluminum were added, and 6.28 mmol of sec-butyllithium was further added. To this, 25.0 g of methyl methacrylate was added, and allowed to react at room temperature for 1 hour. The polymer contained in the reaction liquid was sampled, and the weight average molecular weight (hereinafter referred to as $Mw_{(b1-1)}$) was measured to be 4,500. The above methyl methacrylate polymer is further subjected to block copolymerization with acrylic acid ester such that the above methyl methacrylate polymer serves as a methacrylic acid ester polymer block (b1) (hereinafter referred to as the "methyl methacrylate polymer block (b1-1)").

Then, the reaction liquid was brought to −25° C., and a mixture of 35.0 g of n-butyl acrylate and 15.0 g of benzyl acrylate was added dropwise over 0.5 hour. The polymer contained in the reaction liquid was sampled immediately after dropwise addition, and the weight average molecular weight was measured to be 13,500. Since the weight average molecular weight of the methyl methacrylate polymer block (b1-1) was 4,500, the weight average molecular weight ($Mw_{(b2)}$) of the acrylic acid ester polymer block (b2) comprising a copolymer of n-butyl acrylate and benzyl acrylate was determined to be 9,000.

Subsequently, 25.0 g of methyl methacrylate was added, and the reaction liquid was brought back to room temperature and stirred for 8 hours to form a second methacrylic acid ester polymer block (b1) (hereinafter referred to as the "methyl methacrylate polymer block (b1-2)"). Then, after adding 4 g of methanol to the reaction liquid to quench polymerization, the reaction liquid was poured to a large amount of methanol to allow the block copolymer (B) as a triblock copolymer (hereinafter referred to as the "block copolymer (B-3)") to precipitate, and then isolated by filtering and drying at 80° C. and 1 torr (about 133 Pa) for 12 hours. The weight average molecular weight $Mw_{(B)}$ of the resulting block copolymer (B-3) was found to be 18,000. Since the weight average molecular weight of the diblock copolymer was 13,500, the weight average molecular weight (referred to as $Mw_{(b1-2)}$) of the methyl methacrylate polymer block (b1-2) was determined to be 4,500. Since the weight average molecular weight $Mw_{(b1-1)}$ of the methyl methacrylate polymer block (b1-1) and the weight average molecular weight $Mw_{(b1-2)}$ of the methyl methacrylate polymer block (b1-2) are both 4,500, $Mw_{(b1)}$ is 4,500. The analysis results of the resulting block copolymer (B-3) are shown in Table 1.

Reference Example 4 [Synthesis of Block Copolymer (B-4)]

To a three-necked flask degassed inside and purged with nitrogen, 567 g of dried toluene, 0.09 g of hexamethyltriethylenetetramine and 8.3 g of a toluene solution comprising 3.73 mmol of isobutylbis(2,6-di-t-butyl-4-methylphenoxy) aluminum were added, and 0.38 mmol of sec-butyllithium was further added. To this, 25.0 g of methyl methacrylate was added, and allowed to react at room temperature for 1 hour. The polymer contained in the reaction liquid was sampled, and the weight average molecular weight (hereinafter referred to as $Mw_{(b1-1)}$) was measured to be 75,000. The above methyl methacrylate polymer is further subjected to block copolymerization with acrylic acid ester such that the above methyl methacrylate polymer serves as a methacrylic acid ester polymer block (b1) (hereinafter referred to as the "methyl methacrylate polymer block (b1-1)").

Then, the reaction liquid was brought to −25° C., and a mixture of 35.0 g of n-butyl acrylate and 15.0 g of benzyl acrylate was added dropwise over 0.5 hour. The polymer contained in the reaction liquid was sampled immediately after dropwise addition, and the weight average molecular weight was measured to be 225,000. Since the weight average molecular weight of the methyl methacrylate polymer block (b1-1) was 75,000, the weight average molecular weight ($Mw_{(b2)}$) of the acrylic acid ester polymer block (b2) comprising a copolymer of n-butyl acrylate and benzyl acrylate was determined to be 150,000.

Subsequently, 25.0 g of methyl methacrylate was added, and the reaction liquid was brought back to room temperature and stirred for 8 hours to form a second methacrylic acid ester polymer block (b1) (hereinafter referred to as the "methyl methacrylate polymer block (b1-2)"). Then, after adding 4 g of methanol to the reaction liquid to quench polymerization, the reaction liquid was poured to a large amount of methanol to allow the block copolymer (B) as a triblock copolymer (hereinafter referred to as the "block copolymer (B-4)") to precipitate, and then isolated by filtering and drying at 80° C. and 1 torr (about 133 Pa) for 12 hours. The weight average molecular weight $Mw_{(B)}$ of the resulting block copolymer (B-4) was found to be 300,000. Since the weight average molecular weight of the diblock copolymer was 225,000, the weight average molecular weight (hereinafter referred to as $Mw_{(b1-2)}$) of the methyl methacrylate polymer block (b1-2) was 75,000. Since the weight average molecular weight $Mw_{(b1-1)}$ of the methyl methacrylate polymer block (b1-1) and the weight average molecular weight $Mw_{(b1-2)}$ of the methyl methacrylate polymer block (b1-2) are both 75,000, $Mw_{(b1)}$ is 75,000. The analysis results of the resulting block copolymer (B-4) are shown in Table 1.

Reference Example 5 [Synthesis of Block Copolymer (B-5)]

To a three-necked flask degassed inside and purged with nitrogen, 735 g of dried toluene, 0.4 g of hexamethyltriethylenetetramine and 39.4 g of a toluene solution comprising 20 mmol of isobutylbis(2,6-di-t-butyl-4-methylphenoxy) aluminum were added at room temperature, and 1.17 mmol of sec-butyllithium was further added. To this, 35.0 g of methyl methacrylate was added, and allowed to react at room temperature for 1 hour. The polymer contained in the reaction liquid was sampled, and the weight average molecular weight (hereinafter referred to as $Mw_{(b1)}$) was measured to be 40,000. The above methyl methacrylate polymer is further subjected to block copolymerization with acrylic acid ester such that the above methyl methacrylate polymer serves as a methacrylic acid ester polymer block (b1).

Then, the reaction liquid was brought to −25° C., and a mixture of 24.5 g of n-butyl acrylate and 10.5 g of benzyl acrylate was added dropwise over 0.5 hour. The polymer contained in the reaction liquid was sampled immediately after dropping, and the weight average molecular weight was measured to be 80,000. Since the weight average molecular weight of the methyl methacrylate polymer block (b1) was 40,000, the weight average molecular weight ($Mw_{(b2)}$) of the acrylic acid ester polymer block (b2) comprising a copolymer of n-butyl acrylate and benzyl acrylate was determined to be 40,000. Then, after adding 4 g of methanol to the reaction liquid to quench polymerization, the reaction liquid was poured to a large amount of methanol to allow the block copolymer (B) as a diblock copolymer (hereinafter referred to as the "block copolymer (B-5)") to precipitate, and then isolated by filtering and drying at 80° C. and 1 torr (about 133 Pa) for 12 hours. The analysis results of the resulting block copolymer (B-5) are shown in Table 1.

Reference Example 6 [Synthesis of Block Copolymer (B-6)]

To a three-necked flask degassed inside and purged with nitrogen, 567 g of dried toluene, 0.1 g of hexamethyltriethylenetetramine and 8.3 g of a toluene solution comprising 4.1 mmol of isobutylbis(2,6-di-t-butyl-4-methylphenoxy) aluminum were added, and 0.42 mmol of sec-butyllithium was further added. To this, 33.3 g of methyl methacrylate was added, and allowed to react at room temperature for 1 hour. The polymer contained in the reaction liquid was sampled, and the weight average molecular weight (hereinafter referred to as $Mw_{(b1)}$) was measured to be 80,000. The above methyl methacrylate polymer is further subjected to block copolymerization with acrylic acid ester such that the above methyl methacrylate polymer serves as a methacrylic acid ester polymer block (b1).

Then, the reaction liquid was brought to −25° C., and a mixture of 24.8 g of n-butyl acrylate and 8.5 g of benzyl acrylate was added dropwise over 0.5 hour. The polymer contained in the reaction liquid was sampled immediately after dropping, and the weight average molecular weight was measured to be 160,000. Since the weight average molecular weight of the methyl methacrylate polymer block (b1) was 80,000, the weight average molecular weight ($Mw_{(b2)}$) of the acrylic acid ester polymer block (b2) comprising a copolymer of n-butyl acrylate and benzyl acrylate was determined to be 80,000. Then, after adding 4 g of methanol to the reaction liquid to quench polymerization, the reaction liquid was poured to a large amount of methanol to allow the block copolymer (B) as a diblock copolymer (hereinafter referred to as the "block copolymer (B-6)") to precipitate, and then isolated by filtering and drying at 80° C. and 1 torr (about 133 Pa) for 12 hours. The analysis results of the resulting block copolymer (B-6) are shown in Table 1.

Ion exchange water in 100 parts by mass, sodium sulfate in 0.03 part by mass and a suspending and dispersing agent in 0.45 part by mass were mixed to obtain a mixed liquid. The above mixed liquid in 420 parts by mass and the above raw material liquid in 210 parts by mass were charged into a pressure-tight polymerization tank, and the temperature was then brought to 70° C. with stirring under the nitrogen atmosphere to start a polymerization reaction. When 3 hours passed after the polymerization reaction started, the temperature was increased to 90° C. and stirred for additional 1 hour to obtain a liquid in which bead-like copolymers were dispersed. Note that although a slight polymer adhered to the wall surface or impellers of the polymerization tank, no foaming occurred, and the polymerization reaction proceeded smoothly.

The resulting copolymer dispersion liquid was washed with a proper amount of ion exchange water, and the bead-like copolymers were removed with a bucket type centrifuge separator, and dried in a 80° C. hot air dryer for 12 hours to obtain a bead-like methacrylic resin (A) (hereinafter referred to as the "methacrylic resin (A-1)").

The weight average molecular weight $Mw_{(A)}$ of the resulting methacrylic resin (A-1) was found to be 30,000, and the molecular weight distribution was found to be 1.8.

Reference Example 8 [Synthesis of Methacrylic Resin (A-2)]

The methacrylic resin (A-2) with an $Mw_{(A)}$ of 55,000 and a molecular weight distribution of 1.8 was obtained in the same manner as Reference Example 5 except that the amount of the chain transfer agent was changed to 0.45 part by mass.

TABLE 1

| | Ref. Ex. 1 | Ref. Ex. 2 | Ref. Ex. 3 | Ref. Ex. 4 | Ref. Ex. 5 | Ref. Ex. 6 |
|---|---|---|---|---|---|---|
| Block Copolymer (B) | B-1 | B-2 | B-3 | B-4 | B-5 | B-6 |
| $Mw_{(B)}$ | 120000 | 240000 | 18000 | 300000 | 80000 | 160000 |
| $Mw_{(B)}/Mn_{(B)}$ | 1.13 | 1.17 | 1.11 | 1.19 | 1.11 | 1.15 |
| Refractive Index nd | 1.49 | 1.49 | 1.49 | 1.49 | 1.49 | 1.49 |
| Polymer Block(b1-1) | | | | | | |
| $Mw_{(b1-1)}$ | 40000 | 80000 | 4500 | 75000 | 40000 | 80000 |
| methyl methacrylate unit [mass %] | 100 | 100 | 100 | 100 | 100 | 100 |
| Polymer Block(b2) | | | | | | |
| $Mw_{(b2)}$ | 40000 | 80000 | 9000 | 150000 | 40000 | 80000 |
| n-buthyl acrylate unit [mass %] | 70 | 70 | 70 | 70 | 70 | 70 |
| benzil acrylate unit [mass %] | 30 | 30 | 30 | 30 | 30 | 30 |
| Polymer Block(b1-2) | | | | | | |
| $Mw_{(b1-2)}$ | 40000 | 80000 | 4500 | 75000 | — | — |
| methyl methacrylate unit [mass %] | 100 | 100 | 100 | 100 | — | — |

Reference Example 7 [Synthesis of Methacrylic Resin (A-1)]

To a monomer mixture comprising 95 parts by mass of methyl methacrylate and 5 parts by mass of methyl acrylate, 0.1 part by mass of a polymerization initiator (2,2'-azobis (2-methylpropionitrile), Hydrogen abstraction capacity: 1%, 1-hour half-life temperature: 83° C.) and 0.77 part by mass of a chain transfer agent (n-octylmercaptan) were added and dissolved to obtain a raw material liquid.

Reference Example 9 [Synthesis of Methacrylic Resin (A-3)]

The methacrylic resin (A-3) with an $Mw_{(A)}$ of 80,000 and a molecular weight distribution of 1.8 was obtained in the same manner as Reference Example 5 except that the amount of the chain transfer agent was changed to 0.28 part by mass.

Reference Example 10 [Synthesis of Methacrylic Resin (A-4)]

The methacrylic resin (A-4) with an $Mw_{(A)}$ of 130,000 and a molecular weight distribution of 1.8 was obtained in the same manner as Reference Example 5 except that the amount of the chain transfer agent was changed to 0.16 part by mass.

Example 1

With a twin screw extruder, 20 parts by mass of the block copolymer (B-2) and 80 parts by mass of the methacrylic resin (A-3) were melt-kneaded at 230° C. Then, pellets of the methacrylic resin composition was manufactured by extrusion and cutting.

Extrusion was performed through a die with a width of 900 mm at an extrusion temperature of 250° C. at an extrusion rate of 47 kg/h using a 65-mm Φ vent type single screw extruder, and metal mirrored rolls at 30° C. and 40° C. were used for nipping, and drawing was performed at 10 m/min to form a film with a thickness of 75 μm. The haze, pencil hardness, surface roughness, stress whitening and temperature whitening (80° C.) of this film were measured.

Further, one surface of this film was subjected to corona discharge treatment, and then aluminum was vapor-deposited by the vacuum deposition method. The thickness of the aluminum layer was found to be 30 nm. The resulting laminate film was evaluated for the mirror glossiness. The results are shown in Table 2.

Examples 2 to 7

Pellets were manufactured in the same manner as Example 1 except that the recipes shown in Table 2 were used. Physical properties were determined using these pellets by the same method as in Example 1. Results are shown in Table 2.

Comparative Examples 1 to 7

Pellets were manufactured in the same manner as Example 1 except that the recipes shown in Table 2 were used.

Physical properties were determined using these pellets by the same method as in Example 1. Results are shown in Table 2. Note that in Comparative Example 6, a resin blended with crosslinked rubber particles "PARAPET EB-SN" from Kuraray Co., Ltd. was used instead of the block copolymer (B); and in Comparative Example 7, a resin blended with crosslinked rubber particles "PARAPET GR-100" from Kuraray Co., Ltd. was used instead of the block copolymer (B).

TABLE 2

|  | Ex. 1 | Ex. 2 | Ex. 3 | Ex. 4 | Ex. 5 | Ex. 6 | Ex. 7 |
|---|---|---|---|---|---|---|---|
| methacrylic resin composition | | | | | | | |
| acrylic resin(A) [parts by mass] | | | | | | | |
| methacrylic resin(A-1) $Mw_{(A)}$ = 30000 | | | | | | | |
| methacrylic resin(A-2) $Mw_{(A)}$ = 55000 | | | | | | | |
| methacrylic resin(A-3) $Mw_{(A)}$ = 80000 | 80 | 85 | 80 | | 60 | 80 | 80 |
| methacrylic resin(A-4) $Mw_{(A)}$ = 130000 | | | | 80 | | | |
| PARAPET EB-SN | | | | | | | |
| PARAPET GR-100 | | | | | | | |
| block copolymer(B) [parts by mass] | | | | | | | |
| block copolymer(B-1) $Mw_{(b1)}$ = 40000 $Mw_{(b2)}$ = 40000 | | | 20 | | | | |
| block copolymer(B-2) $Mw_{(b1)}$ = 80000 $Mw_{(b2)}$ = 80000 | 20 | 15 | | 20 | 40 | | |
| block copolymer(B-3) $Mw_{(b1)}$ = 4500 $Mw_{(b2)}$ = 9000 | | | | | | | |
| block copolymer(B-4) $Mw_{(b1)}$ = 75000 $Mw_{(b2)}$ = 150000 | | | | | | | |
| block copolymer(B-5) $Mw_{(b1)}$ = 40000 $Mw_{(b2)}$ = 40000 | | | | | | 20 | |
| block copolymer(B-6) $Mw_{(b1)}$ = 80000 $Mw_{(b2)}$ = 80000 | | | | | | | 20 |
| $Mw_{(A)}/Mw_{(b1)}$ | 1.0 | 1.0 | 2.0 | 0.7 | 1.0 | 2.0 | 1.0 |
| Physical properties of film | | | | | | | |
| Haze | 0.2 | 0.2 | 0.2 | 0.2 | 0.2 | 0.1 | 0.1 |
| Surface hardness (pencil hardness) | H | H | H | H | B | H | H |
| Surface roughness (nm) | 1.1 | 0.9 | 0.9 | 1.1 | 1.3 | 0.9 | 0.8 |
| Stress whitening | ○ | ○ | ○ | ○ | ○ | ○ | ○ |
| Temperature whitening (80° C.) | ○ | ○ | ○ | ○ | ○ | ○ | ○ |
| Mirror glossiness of laminate film | ○ | ○ | ○ | ○ | ○ | ○ | ○ |

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| methacrylic resin composition | | | | | | | |
| acrylic resin(A) [parts by mass] | | | | | | | |
| methacrylic resin(A-1) $Mw_{(A)}$ = 30000 | | | | | 80 | | |
| methacrylic resin(A-2) $Mw_{(A)}$ = 55000 | 80 | | | | | | |
| methacrylic resin(A-3) $Mw_{(A)}$ = 80000 | | | | | 20 | | 70 |
| methacrylic resin(A-4) $Mw_{(A)}$ = 130000 | | | 80 | 80 | | | |
| PARAPET EB-SN | | | | | | 30 | |
| PARAPET GR-100 | | | | | | | 100 |
| block copolymer(B) [parts by mass] | | | | | | | |
| block copolymer(B-1) $Mw_{(b1)}$ = 40000 $Mw_{(b2)}$ = 40000 | | | | | | | |
| block copolymer(B-2) $Mw_{(b1)}$ = 80000 $Mw_{(b2)}$ = 80000 | | | 20 | | 80 | | |
| block copolymer(B-3) $Mw_{(b1)}$ = 4500 $Mw_{(b2)}$ = 9000 | 20 | | | | | | |

TABLE 2-continued

| | | | | | | | |
|---|---|---|---|---|---|---|---|
| block copolymer(B-4) Mw$_{(b1)}$ = 75000 Mw$_{(b2)}$ = 150000 | | | 20 | | 20 | | |
| Mw$_{(A)}$/Mw$_{(b1)}$ | 12.2 | 3.25 | 0.9 | 1.0 | 0.4 | — | — |
| Physical properties of film | | | | | | | |
| Haze | 0.2 | 0.2 | 0.3 | 1.5 | 0.2 | 0.9 | 0.5 |
| Surface hardness (pencil hardness) | H | H | F | 6B≧ | B | H | 6B≧ |
| Surface roughness (nm) | 1.5 | 3 | 3.3 | 5.4 | 3.4 | 5.1 | 6.2 |
| Stress whitening | ○ | ○ | ○ | ○ | ○ | Δ~x | ○ |
| Temperature whitening (80° C.) | Δ | Δ | Δ | ○ | ○ | x | ○ |
| Mirror glossiness of laminate film | ○ | Δ | Δ | x | Δ | Δ~x | Δ~x |

These results indicate that a film produced using a methacrylic resin composition comprising the methacrylic resin (A) and the block copolymer (B) in the mass ratio of 50/50 to 99/1 has excellent surface smoothness, transparency, surface hardness and the like, and has reduced whitening even upon stretched and heated, the weight average molecular weight Mw$_{(A)}$ of the methacrylic resin (A) is in the range of not less than 0.5 and not more than 2.3 relative to the largest weight average molecular weight Mw$_{(b1)}$ of the methacrylic acid ester polymer blocks (b1), the block copolymer (B) having the largest weight average molecular weight Mw$_{(b2)}$ of the acrylic acid ester polymer blocks (b2) in the range of not less than 30000 and not more than 120000.

Moreover, good mirror glossiness was also obtained for the laminated product produced using the laminate film according to Example 1.

The invention claimed is:

1. An acrylic resin film comprising
   50 to 99 parts by mass of a methacrylic resin (A) comprising not less than 80% by mass of a structural unit derived from methyl methacrylate and
   50 to 1 part by mass of a di-block copolymer (B) comprising 40 to 90% by mass of a methacrylic acid ester polymer block (b1) and 10 to 60% by mass of an acrylic acid ester polymer block (b2),
   wherein the di-block copolymer (B) is dispersed in a matrix of the methacrylic resin (A), a total of the methacrylic resin (A) and the di-block copolymer (B) is 100 parts by mass, and the methacrylic resin (A) and the di-block copolymer (B) satisfy inequalities (1) and (2):

$$0.5 \leq Mw_{(A)}/Mw_{(b1)} \leq 2.3 \quad (1)$$

$$30000 \leq Mw_{(b2)} \leq 120000 \quad (2)$$

wherein Mw$_{(A)}$ is a weight average molecular weight of the methacrylic resin (A), Mw$_{(b1)}$ is a weight average molecular weight of the methacrylic acid ester polymer block (b1) and Mw$_{(b2)}$ is a weight average molecular weight of the acrylic acid ester polymer block (b2).

2. The acrylic resin film according to claim 1, wherein the di-block copolymer (B) has a refractive index of 1.485 to 1.495.

3. The acrylic resin film according to claim 1, wherein the acrylic acid ester polymer block (b2) comprises 50 to 90% by mass of a structural unit derived from an acrylic acid alkyl ester, and 50 to 10% by mass of a structural unit derived from an aromatic (meth)acrylic acid ester.

4. The acrylic resin film according to claim 1, wherein the acrylic resin film has a surface roughness of not more than 1.5 nm.

5. The acrylic resin film according to claim 1, wherein the acrylic resin film has a surface pencil hardness of not softer than HB.

6. The acrylic resin film according to claim 1, further comprising printing on at least one surface of the acrylic resin film.

7. A laminated product having a surface layer, wherein the surface layer comprises the acrylic resin film according to claim 1.

8. The acrylic resin film according to claim 1, wherein the acrylic resin film has a thickness of not more than 500 μm.

9. The acrylic resin film according to claim 1, wherein the acrylic resin film has a haze of not more than 0.3% at a thickness of 75 μm.

10. The acryl resin film according to claim 1, wherein the di-block copolymer (B) has a weight average molecular weight Mw$_{(B)}$ of not less than 60000 and not more than 300000 and a molecular weight distribution of not less than 1.0 and not more than 2.0.

11. The acrylic resin film according to claim 1, wherein Mw$_{(b1)}$ is not less than 12000 and not more than 100000 and Mw$_{(b2)}$ is not less than 30000 and not more than 100000.

12. The acrylic resin film according to claim 1, wherein the methacrylic resin (A) has Mw$_{(A)}$ of not less than 30000 and not more than 180000, and a ratio Mw$_{(A)}$/Mn$_{(A)}$ of not less than 1.03 and not more than 2.6, wherein Mn$_{(A)}$ is a number average molecular weight of the methacrylic resin (A).

13. The acrylic resin film according to claim 1, wherein the di-block copolymer (B) has a weight average molecular weight Mw$_{(B)}$ of not less than 80000 and not more than 240000 and a molecular weight distribution of not less than 1.11 and not more than 1.17.

14. The acrylic resin film according to claim 1, wherein Mw$_{(b1)}$ is not less than 40000 and not more than 80000 and Mw$_{(b2)}$ is not less than 40000 and not more than 80000.

15. The acrylic resin film according to claim 1, wherein the methacrylic resin (A) has Mw$_{(A)}$ of not less than 55000 and not more than 80000, and a ratio Mw$_{(A)}$/Mn$_{(A)}$ of not less than 1.03 and not more than 2.6, wherein Mn$_{(A)}$ is a number average molecular weight of the methacrylic resin (A).

16. The acrylic resin film according to claim 1, wherein the di-block copolymer (B) has a weight average molecular weight Mw$_{(B)}$ of not less than 80000 and not more than 160000 and a molecular weight distribution of not less than 1.11 and not more than 1.17.

17. A laminate film comprising
   the acrylic resin film according to claim 1, and
   a layer comprising a metal and/or a metal oxide, a thermoplastic resin layer or a base material layer, wherein the layer is disposed on at least one surface of the acrylic resin film.

18. A laminated product having a surface layer, wherein the surface layer comprises the laminate film according to claim 17.

19. The laminate film according to claim 17, wherein the layer is a deposited film of a metal and/or a metal oxide, and the deposited film has a thickness of 5 to 250 nm.

20. A method for manufacturing an acrylic resin film, the method comprising:

polymerizing a monomer constituting a methacrylic acid ester polymer block (b1) and polymerizing a monomer constituting an acrylic acid ester polymer block (b2) to prepare a di-block copolymer (B) comprising 40 to 90% by mass of the methacrylic acid ester polymer block (b1) and 10 to 60% by mass of the acrylic acid ester polymer block (b2), melt-kneading 50 to 99 parts by mass of a methacrylic resin (A) comprising not less than 80% by mass of a structural unit derived from methyl methacrylate with 50 to 1 part by mass of the di-block copolymer (B), provided that a total of the methacrylic resin (A) and the di-block copolymer (B) is 100 parts by mass, to obtain a methacrylic resin composition, and forming the methacrylic resin composition into a film shape, wherein the di-block copolymer (B) is dispersed in a matrix of the methacrylic resin (A), and the methacrylic resin (A) and the di-block copolymer (B) satisfy inequalities (1) and (2):

$$0.5 \leq Mw_{(A)}/Mw_{(b1)} \leq 2.3 \tag{1}$$

$$30000 \leq Mw_{(b2)} \leq 120000 \tag{2}$$

wherein $Mw_{(A)}$ is a weight average molecular weight of the methacrylic resin (A), $Mw_{(b1)}$ is a weight average molecular weight of the methacrylic acid ester polymer block (b1) and $Mw_{(b2)}$ is a weight average molecular weight of the acrylic acid ester polymer block (b2).

* * * * *